(12) United States Patent
Wong et al.

(10) Patent No.: US 7,092,606 B2
(45) Date of Patent: Aug. 15, 2006

(54) DYNAMICALLY TUNABLE PHOTONIC BANDGAP MICROCAVITY WAVEGUIDES VIA MECHANICAL LATTICE CONTROL

(75) Inventors: Chee Wei Wong, Cambridge, MA (US); Steven G. Johnson, Cambridge, MA (US); George Barbastathis, Boston, MA (US); Sang-Gook Kim, Wayland, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/620,072

(22) Filed: Jul. 15, 2003

(65) Prior Publication Data

US 2004/0076362 A1      Apr. 22, 2004

Related U.S. Application Data

(63) Continuation-in-part of application No. 10/619,203, filed on Jul. 14, 2003.

(60) Provisional application No. 60/395,926, filed on Jul. 15, 2002, provisional application No. 60/467,854, filed on May 5, 2003.

(51) Int. Cl.
*G02B 6/10* (2006.01)

(52) U.S. Cl. .......................................... 385/129; 385/5

(58) Field of Classification Search ................... 385/1, 385/2, 4, 8, 9, 14–39, 40, 122, 129–132
See application file for complete search history.

(56) References Cited

U.S. PATENT DOCUMENTS

| 5,313,535 A | * | 5/1994 | Williams ...................... 385/14 |
| 6,445,838 B1 | * | 9/2002 | Caracci et al. ................ 385/14 |
| 2002/0054424 A1 | | 5/2002 | Miles | |

FOREIGN PATENT DOCUMENTS

WO        02/10843        2/2002

OTHER PUBLICATIONS

"Photonic-bandgap microcavities in optical waveguides," Foresi et al. *Nature.* Nov. 1997. vol. 390.
"Strain-tunable photonic band gap crystals," Kim et al. *Applied Physics Letters.* May 2001. vol. 78, No. 20.

* cited by examiner

*Primary Examiner*—Juliana Kang
(74) *Attorney, Agent, or Firm*—Gauthier & Connors LLP

(57) ABSTRACT

A photonic bandgap microcavity is provided. The microcavity includes a membrane structure that can experience strain. A photonic bandgap waveguide element is formed on the membrane structure having a defect so that when the membrane structure is strained, the photonic bandgap waveguide element is tuned to a selective amount.

16 Claims, 5 Drawing Sheets

DYNAMICALLY TUNABLE PHOTONIC BANDGAP MICROCAVITY WAVEGUIDES VIA MECHANICAL LATTICE CONTROL

PRIORITY INFORMATION

This application claims priority from provisional application Ser. No. 60/395,926 filed Jul. 15, 2002, provisional application Ser. No. 60/467,854 filed on May 5, 2003, and is a continuation-in-part of application Ser. No. Unknown filed Jul. 14, 2003 (Express Mail No. EV271853767US), entitled "Reconfigurable Microphotonics Devices Via Deformable Membrane Platforms," by common assignee.

BACKGROUND OF THE INVENTION

The invention relates to the field of microphotonics, and in particular to tuning a photonic bandgap in a microcavity waveguide structure via mechanical deformation.

The vast majority of microphotonic devices possess a wide spectrum of applications. Most of these devices are static devices, where reconfiguration is not possible after device fabrication. To achieve tuning of microphotonic devices, the electro-optic effect, the charge-carrier effect (via temperature and/or doping), and the liquid crystal tuning methods have been used. There is a need in the art for a method of tuning on the order of 13 nm for resonant frequency centered at 1.552 μm for the 40 nm wide C-band in optical telecommunications. Moreover, there is a need also to allow tunability and control in silicon microphotonic devices.

SUMMARY OF THE INVENTION

According to one aspect of the invention, there is provided a photonic bandgap microcavity. The microcavity includes a membrane structure that can experience strain. A photonic bandgap waveguide element is formed on the membrane structure having a defect so that when the membrane structure is strained, the photonic bandgap waveguide element is tuned to a selective amount.

According to another aspect of the invention, there is provided a method of forming a photonic bandgap microcavity. The method includes providing a membrane structure that can experience strain. The method also includes forming a photonic bandgap waveguide element on the membrane structure having a defect so that when the membrane structure is strained, the photonic bandgap waveguide element is tuned to a selective amount.

DETAILED DESCRIPTION OF THE INVENTION

The invention uses a new concept of tuning a photonic bandgap in a microcavity waveguide structure via mechanical deformation. A photonic crystal structure is superimposed onto a thin sub-micron deformable membrane, and controlled deformation of the membrane will allow the geometric lattice structure to be tuned via mechanical strain. Membrane deformation is made possible with the use of thin-film piezoelectric actuators. With the controlled deformation, optical properties of the microcavity waveguide, such as resonance in the bandgap of the transmission spectra, the size of the bandgap, the quality factor Q of a cavity, and other optical properties can be tuned. Fine control of the mechanical strain, through the piezoelectric actuators, will allow fine-tuning of these optical properties. The inventive device can be used in integrated photonic chip architectures and devices, such as low-threshold microlasers, filters, signal routers, and the like.

Moreover, this invention will also allow for dynamic tuning of these properties, either in part of the device function or in response to external disturbances. Real-time reconfigurability of the photonic crystals can be achieved. The range of tunability is on the same order of magnitude with electro-optic and charge-carrier tunability effects in compound semiconductor materials.

In addition, mechanical strain-tuning provides tunability to silicon microphotonic devices, given the absence of electro-optic and charge-carrier effects in silicon. Although thermal tuning provides an alternative for tunability in silicon microphotonics, it requires high power consumption, has poor spatial localization of the tunability, and has a relatively slow response time compared to mechanical strain-tuning with piezoelectric actuators.

Figure 1A:
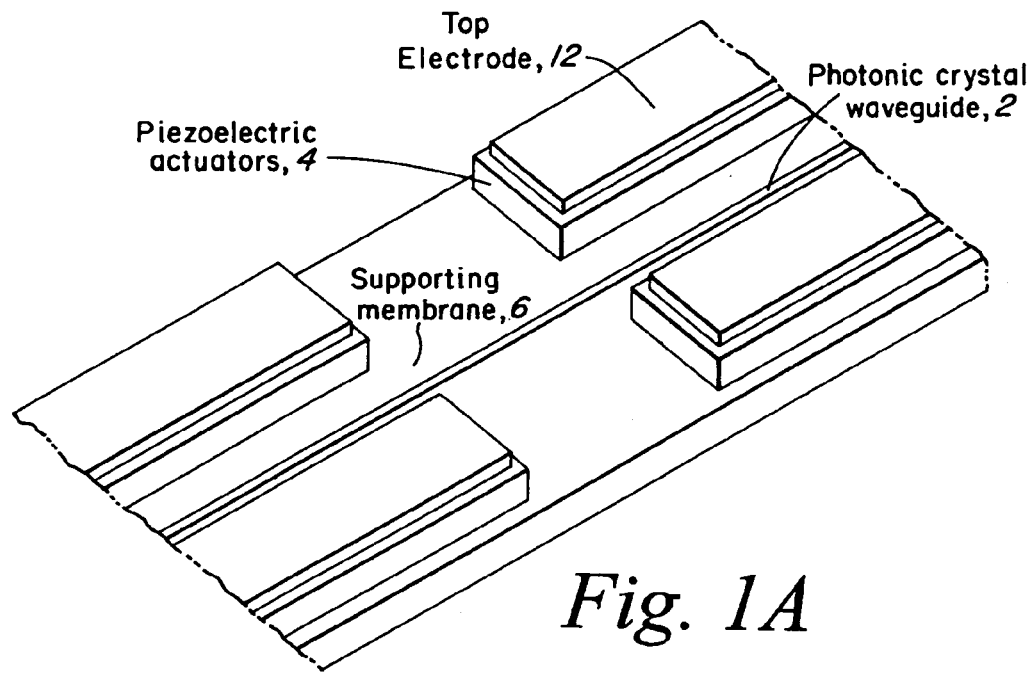
FIG. 1A is a schematic block diagram illustrating the concept of strain-tuning photonic bandgap microcavity waveguides.
Figure 1B:
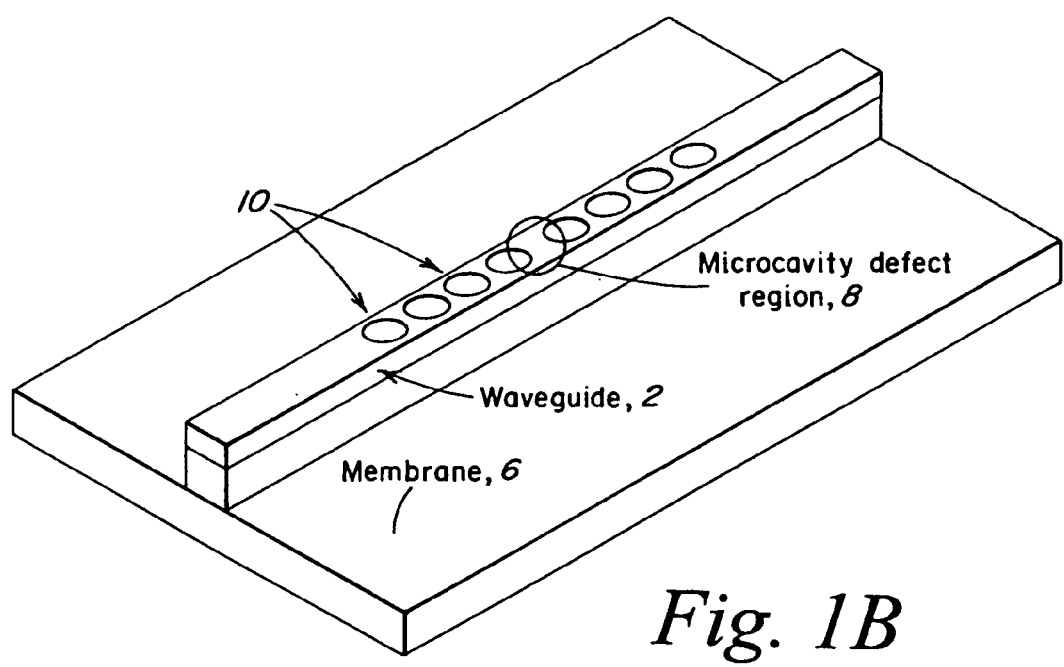
FIG. 1B is an expanded view of FIG. 1A.

A single mode photonic crystal waveguide 2 is used to both confine light along two dimensions and maintain a preferred polarization of the guided mode, as shown in FIG. 1A. The introduction of a periodic array of holes 10, in a 1-dimensional photonic crystal waveguide 2, into the waveguide limits the wavevector to $\pi/a$, where a is the lattice constant, or spatial period, of the array of holes 10, as shown in FIG. 1B. This allowable range of wavevectors is similar to the Brillouin zone used in solid-state physics. In addition, the 1-dimensional photonic crystal waveguide 2 has the effect of folding the dispersion relation of the strip waveguide and of splitting the lowest-order mode. The splitting at the Brillouin zone edge produces a bandgap, the size of which is strongly affected by the dielectric contrast.

The addition of a defect 8 by creating a break in the periodicity in the 1 dimensional photonic crystal waveguide 2 allows a state to propagate in the bandgap. This state is analogous to a defect or impurity state in a semiconductor that forms a level within the semiconductor bandgap. Conceptually, this is also analogous to 1-dimensional Fabry-Perot resonators, although it has a coplanar geometry and the ability to give rise to strong field confinement. The break in the periodicity leads to a defect state that is localized in real space and therefore extended in the wavevector space.

Control of the periodicity of defect 8, with length $a_d$, leads to tuning of the resonant frequency as a tunable resonator or filter. While electro-optic and thermal tuning could be used to control the optical path length or the break in periodicity, mechanical tuning is preferable due to reasons described earlier.

The thin-film membrane 6, on the order of 200–400 nm in thickness, is mechanically-strained through the thin-film piezoelectric actuators 4, such as lead zirconate titanate (PZT), poly-vinylidene fluoride (PVDF), zinc oxide or aluminum nitride. The high power density, which is on the order of 1000 W/kg, of the PZT actuators provides a predicted and experimentally measured strain of approximately 0.2% on the deformable membrane. The specific mechanical tuning range depends on the design, actual fabrication, and material selection. With super-imposing the photonic crystal waveguide 2, both the lattice constant and the ratio of defect length over the lattice constant are changed.

Figure 2:
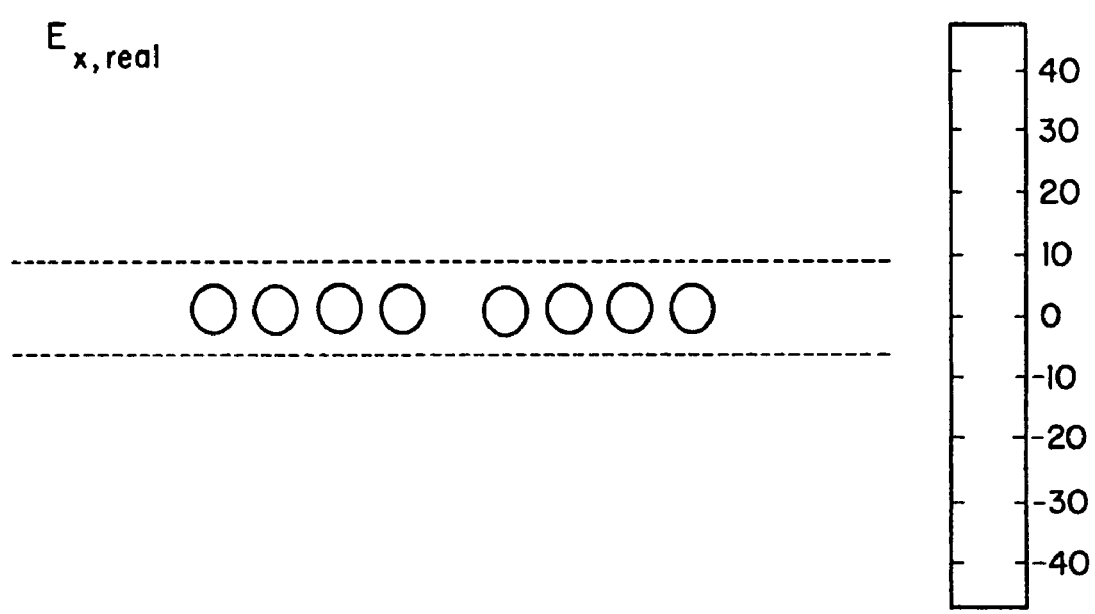
FIG. 2 is a two-dimensional representation of a three-dimensional finite-difference time-domain computation of the microcavity waveguide.

FIG. 2 shows an exemplary two-dimension slice of the $E_{x,real}$ field distribution, where x is the direction along the waveguide 2 described in FIGS. 1A and 1B. The total quality factor Q, where Q is the fractional width at half-maximum of the resonance transmission response, of 180 is derived based on the information shown in FIG. 2. Superimposed on the field distribution are the locations of the dielectric boundaries, for a Si waveguide with air holes. The high dielectric contrast, between air and silicon or silicon oxide and silicon, leads to strong mode localization, permitting high-density packing of the microcavity waveguides. The maximum amount of deformation will be limited by the strain limit of the membrane or the actuators. For a PZT piezoelectric actuator, the strain limit could reach up to 0.1%, without mechanical amplification. The ratio of the PZT actuator length to membrane length serves as an amplification factor. The strain limit of the photonic crystal material is highly dependent on the surface roughness of the material; a Si material with surface roughness below 20 nm (in order for low optical scattering in the waveguide) has fracture stresses above order of 1 GPa, corresponding to a strain limit of 0.7%. While the strain limit is dependent on the detailed microfabrication process and expressed as a probability distribution function through Weibull statistics, a strain of 0.2 to 0.3% is a safe estimate.

Figure 3:
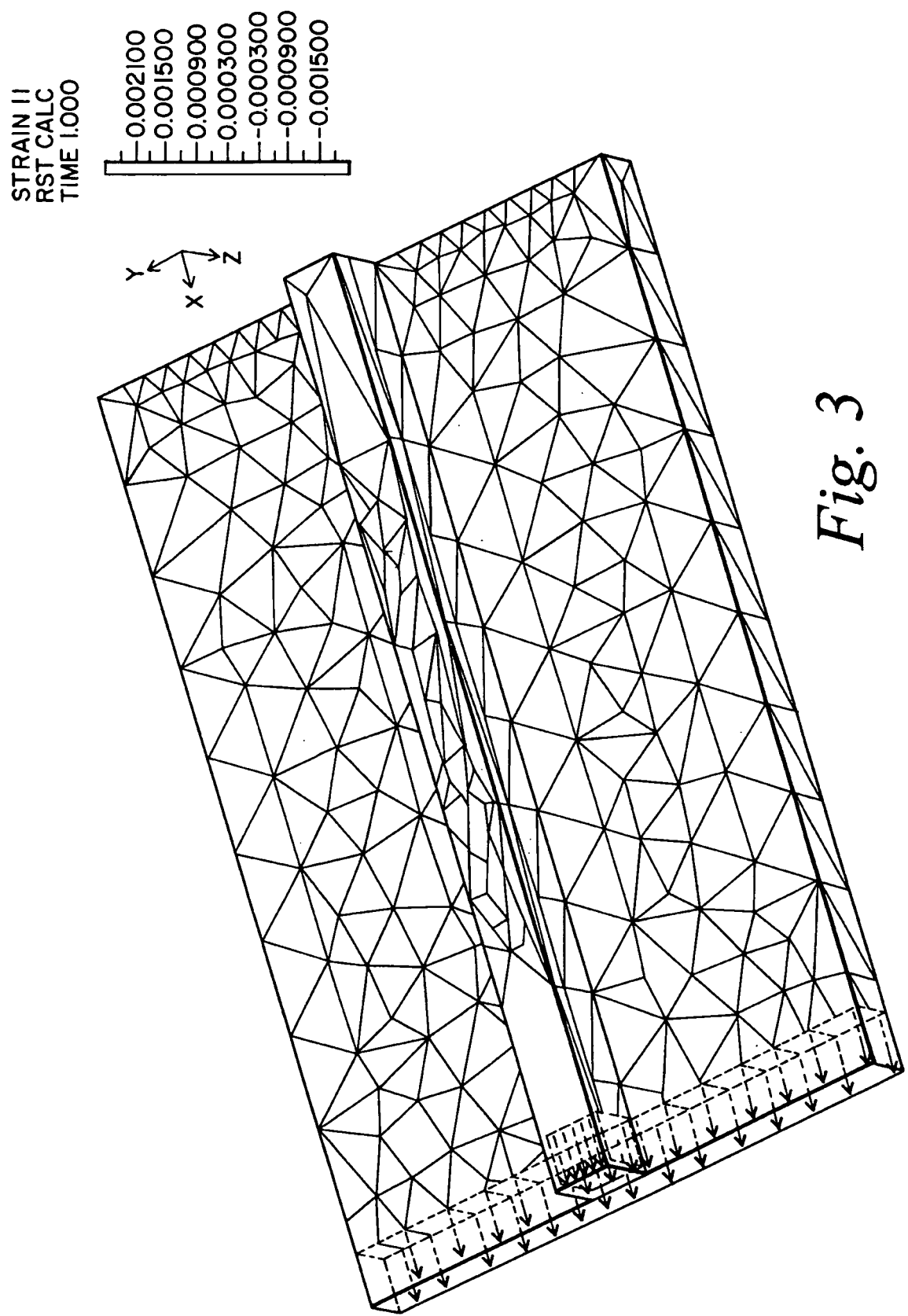
FIG. 3 is a schematic diagram demonstrating strain on the microcavity waveguide.

FIG. 3 shows a finite-element model of the microcavity waveguide under mechanical strain. The local strain at the hole region between two hole centers is larger than that at the defect region, and approximately 1.5 times the strain in the defect. The strain in the defect is on the order of the external applied strain. This factor of 1.5 contributes added tunability to the resonant frequency, since the $a_d/a$ ratio is further changed under mechanical strain. The $a_d/a$ ratio affects the frequency of the resonant mode within the photonic bandgap; a larger $a_d/a$ ratio leads to a lower resonant frequency for all other dimensions kept the same.

As the expected tunability range is on the order of 1%, direct numerical FDTD simulation to capture the effects would require a very fine-mesh and would be computationally intensive. Instead, perturbation theory of Maxwell's equation provides an elegant method to describe the tunability, overcoming the issues of numerical accuracy. Moreover, perturbation theory captures shape-profile distortions in the periodic structures, which in our scenario is the elliptical profile of the circular holes under deformation. The elliptical displacement profile is derived analytically, beginning from the stress mechanics of the hole-in-a-plate situation. The change in the resonant frequency with respect to an applied external perturbation, $d\omega/d\alpha$, can be described as follows:

$$\frac{d\omega}{d\alpha} = -\frac{\omega^{(0)}}{2} \frac{\langle E^{(0)} | \frac{d\varepsilon}{d\alpha} | E^{(0)} \rangle}{\langle E^{(0)} | \varepsilon | E^{(0)} \rangle} \qquad \text{Eq. 1}$$

where $\omega^{(0)}$ is the resonant frequency before strain-deformation, $E^{(0)}$ the electric field distribution before strain-deformation, $\alpha$ the perturbation parameter (external applied stress in this scenario) and $\in$ the permittivity. Specifically, the top integral, summed over the dielectric boundary area A, can be expressed as:

$$\langle E^{(0)} | \frac{d\varepsilon}{d\alpha} | E^{(0)} \rangle = \int dA \frac{dh}{d\alpha} [\Delta\varepsilon_{12} |E_\parallel^{(0)}|^2 - \Delta\varepsilon_{12}^{-1} |D_\perp^{(0)}|^2] \qquad \text{Eq. 2}$$

where $dh/d\alpha$ is the change in dielectric boundary given the applied external stress, $E_\parallel$ the electric field parallel to the boundary, $D_\perp$ the electric displacement perpendicular to the boundary, $\Delta\in_{12}$ the difference of permittivity $\in_1$ and $\in_2$, and $\Delta\in_{12}^{-1}$ the difference in the reciprocal of the permittivities.

The bottom integral, $<E^{(0)}|\in|E^{(0)}>$, is the volume integral of the electric field in the structure of interest. With the unperturbed FDTD results, the perturbation computations are performed, using analytical results of the elliptical nature under stress deformation to derive $dh/d\alpha$, and employing interpolation between the discretized FDTD mesh to obtain $E_\parallel$ and $D_\perp$. The results show a 1.41% tunability in the resonance peak with 0.5% externally applied tensile strain. The tuning is linear with response to the applied strain, and has a 13 nm shift in resonance at 0.3% externally applied strain for C-band telecommunication wavelengths.

Specifically, confinement of strain at solely the defect cavity (changing only $a_d$) results in a +0.58% change in resonance wavelength for +0.5% change in $a_d$. Secondly, increasing only the lattice constant a, however, has two effects: (1) an increase in the geometric size and hence increasing the operating wavelength and shifting the bandgap (in terms of wavelengths) upwards, (2) a decrease in the $a_d/a$ ratio and hence leading to a decrease in the resonance wavelength within the bandgap. The net result of all these effects is found through computation and has a +0.8215% change in resonance wavelength for a +0.5% change in lattice constant a.

Finally, the effects of ellipticity are included and found to decrease the resonance wavelength. The complete computation, including strain at defect cavity, strain at lattice constant and ellipticity of holes, shows a +1.41% change in resonance wavelength for a +0.5% mechanical tensile strain.

Figure 4A:
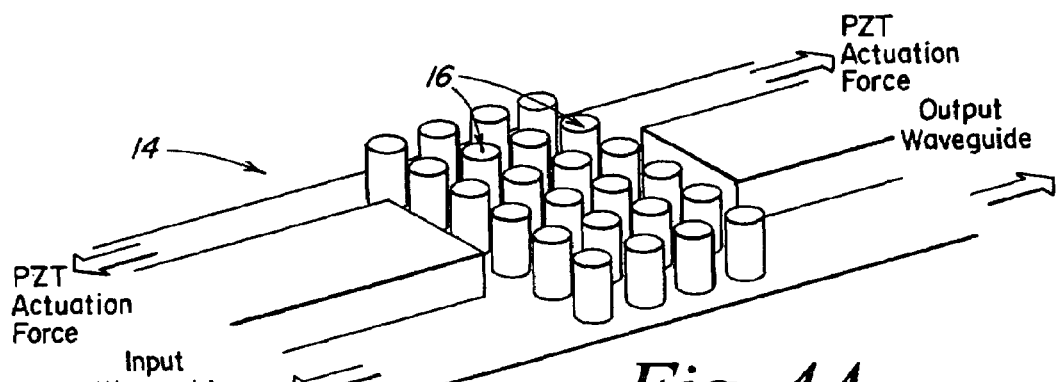
FIGS. 4A–4C are schematic block diagrams of other configurations of tunable photonic waveguides used in accordance with the invention.
Figure 4B:
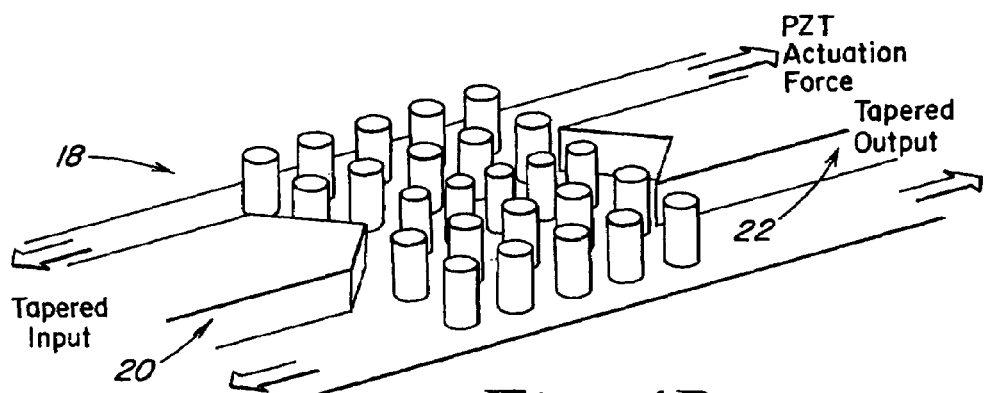
Figure 4C:
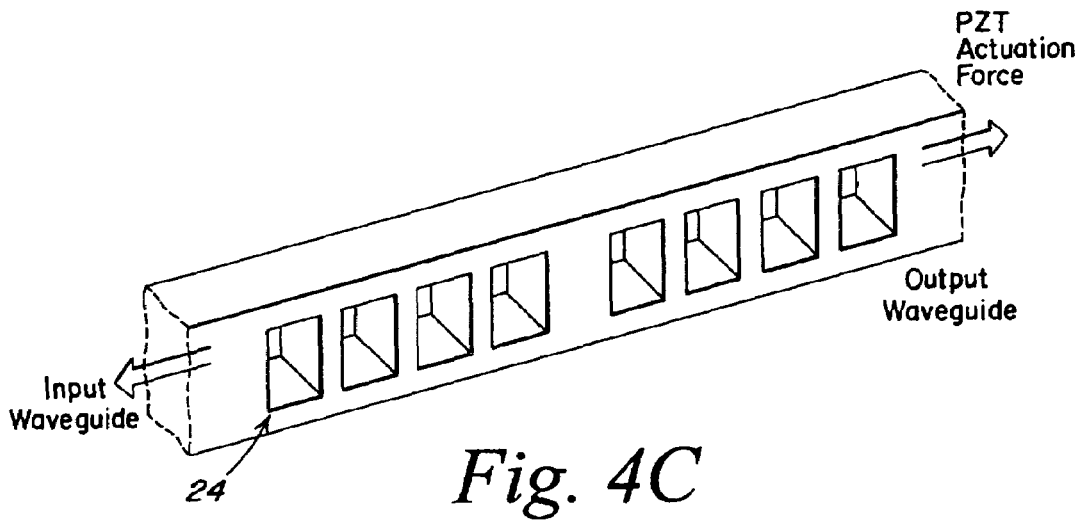

Other configurations of tunable photonic crystal waveguides are illustrated in FIGS. 4A–4C. FIG. 4A shows two-dimensional photonic crystal 14 with ridge waveguides 16. FIG. 4B shows a two-dimensional photonic crystal 18 with tapered input 20 and output 22 coupling waveguides. FIG. 4C shows an one-dimensional photonic crystal waveguide 24 for polarization in the vertical direction (Transverse Magnetic modes).

Figure 5:
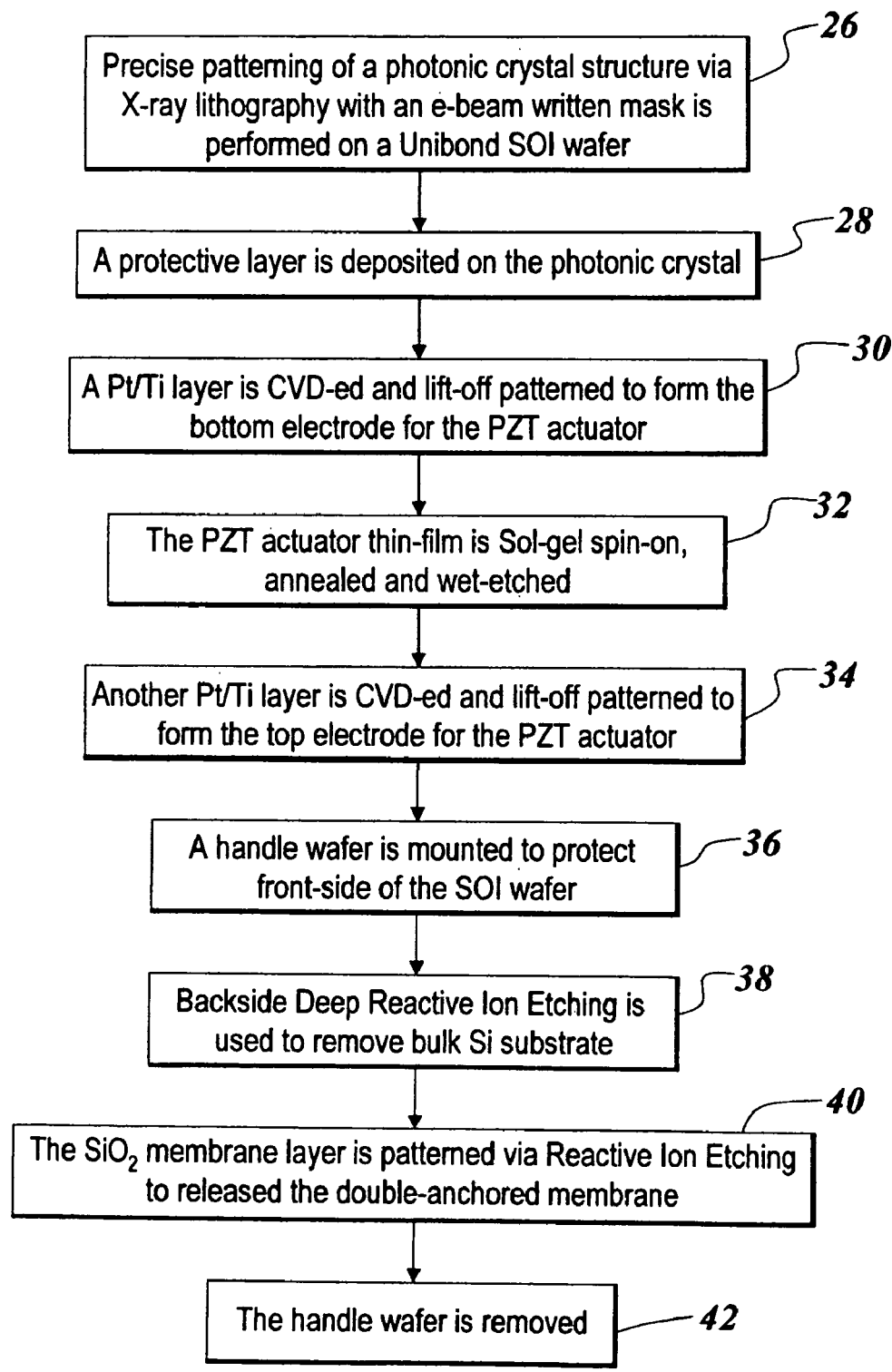
FIG. 5 is a flowchart demonstrating the steps used in fabricating a tunable photonic bandgap microcavity waveguide.

FIG. 5 shows a flowchart of steps needed to fabricate the inventive microcavity. Firstly, precise patterning of a photonic crystal structure via X-ray lithography with an electron-beam written mask is performed on a Unibond SOI wafer (step 26). A protective layer, such as $SiN_x$, is deposited on the photonic crystal (step 28). A Pt/Ti layer is CVDed and lift-off patterned to form the bottom electrode for the PZT actuator (step 30). The PZT actuator thin-film is Sol-gel spin-on, annealed and wet-etched (step 32). Another Pt/Ti layer is CVDed and lift-off patterned to form the top electrode for the PZT actuator (step 34). The top and bottom Pt/Ti electrodes provide a differential voltage to the thin-film PZT. A handle wafer is mounted to protect front-side of the SOI wafer (step 36). Backside Deep Reactive Ion Etching is used to remove bulk Si substrate (step 38). The $SiO_2$ membrane layer is patterned via Reactive Ion Etching to free the membrane (step 40). The handle wafer is removed (step 42).

Although the present invention has been shown and described with respect to several preferred embodiments thereof, various changes, omissions and additions to the form and detail thereof, may be made therein, without departing from the spirit and scope of the invention.

What is claimed is:

1. A photonic bandgap microcavity comprising:
   a deformable membrane structure that can experience strain using a plurality of thin-film actuators of at least 0.2% on the deformable membrane, said deformable membrane having semiconductor materials that do not exhibit piezoelectric effects; and
   a photonic bandgap waveguide element formed on said deformable membrane structure having a defect region that breaks the periodicity of a plurality of periodic holes so that when said deformable membrane structure is strained, said photonic bandgap waveguide element is tuned to a selective amount due to the strain experienced in the defect region of said photonic bandgap waveguide element and said microcavity is not permanently disfigured.

2. The photonic bandgap microcavity of claim 1, wherein said deformable membrane structure comprises a sub-micron $SiO_2$ layer.

3. The photonic bandgap microcavity of claim 1, wherein said photonic bandgap waveguide element comprises a 1-dimensional photonic crystal.

4. The photonic bandgap microcavity of claim 1, wherein said selective amount comprises approximately 1%.

5. The photonic bandgap microcavity of claim 1, wherein said at least one actuator produces strain on said deformable membrane between 0.2 and 0.3%.

6. The photonic bandgap microcavity of claim 1, wherein said at least one actuator comprises a top electrode.

7. The photonic bandgap microcavity of claim 6, wherein said at least one actuator comprises a bottom electrode.

8. The photonic bandgap microcavity of claim 1, wherein said at least one actuator comprises a PZT piezoelectric actuator.

9. A method of forming a photonic bandgap microcavity comprising:
   forming a deformable membrane structure that can experience strain using a plurality of thin-film actuators of at least 0.2% on the deformable membrane, said deformable membrane having semiconductor materials that do not exhibit piezoelectric effects; and
   forming a photonic bandgap waveguide element on said deformable membrane structure having a defect region that breaks the periodicity of a plurality of periodic holes that when said deformable membrane structure is strained, said photonic bandgap waveguide element is tuned to a selective amount due to the strain experienced in the defect region of said photonic bandgap waveguide element and said microcavity is not permanently disfigured.

10. The method of claim 9, wherein said deformable membrane structure comprises a sub-micron $SiO_2$ layer.

11. The method of claim 9, wherein said photonic bandgap waveguide element comprises a 1-dimensional photonic crystal.

12. The method of claim 9, wherein said selective amount comprises approximately 1%.

13. The method of claim 9, wherein said at least one actuator produces strain on said deformable membrane between 0.2 and 0.3%.

14. The method of claim 9, wherein said at least one actuator comprises a top electrode.

15. The method of claim 14, wherein said at least one actuator comprises a bottom electrode.

16. The method of claim 9, wherein said at least one actuator comprises a PZT piezoelectric actuator.

* * * * *